United States Patent
Büchler

(10) Patent No.: US 7,123,572 B2
(45) Date of Patent: Oct. 17, 2006

(54) METHOD FOR REDUCING THE NOISE IN A WOBBLE SIGNAL

(75) Inventor: Christian Büchler, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 390 days.

(21) Appl. No.: 10/486,570

(22) PCT Filed: Aug. 5, 2002

(86) PCT No.: PCT/EP02/08705

§ 371 (c)(1),
(2), (4) Date: Feb. 10, 2004

(87) PCT Pub. No.: WO03/017261

PCT Pub. Date: Feb. 27, 2003

(65) Prior Publication Data

US 2004/0208090 A1    Oct. 21, 2004

(30) Foreign Application Priority Data

Aug. 16, 2001    (DE) ............................... 101 40 326

(51) Int. Cl.
*G11B 7/095* (2006.01)
(52) U.S. Cl. .................................................. 369/124.12
(58) Field of Classification Search ............ 369/124.12
See application file for complete search history.

(56) References Cited

U.S. PATENT DOCUMENTS

| 5,339,302 | A |   | 8/1994 | Takahashi et al. ............ 369/54 |
| 5,434,834 | A | * | 7/1995 | Shinoda et al. .......... 369/44.13 |
| 5,631,892 | A |   | 5/1997 | Bakx .......................... 369/124 |
| 5,717,679 | A |   | 2/1998 | Mashimo et al. ........... 369/124 |
| 2001/0026512 | A1 |   | 10/2001 | Nishimura et al. ...... 369/47.26 |

OTHER PUBLICATIONS

Copy of Search Report dated Nov. 14, 2002.

* cited by examiner

*Primary Examiner*—Gautam R. Patel
(74) *Attorney, Agent, or Firm*—Joseph J. Laks; Robert D. Shedd; Reitseng Lin

(57) ABSTRACT

The present invention relates to a method and a circuit for recovering information contained in a wobbled track on an optical storage medium. One aim of the invention is to describe a method within an appliance for reading from and/or writing to optical storage media, which can correct disturbing data signal components in the wobble signal even when the swept frequency and the lowest signal frequency are close to one another. According to the invention, this object is achieved in that the signals from two detector halves of a photodetector which is used for reading the data contained in a track on an optical storage medium are provided with weighting factors which are adjusted dynamically during operation of the appliance. In order to adjust the weighting factors, the data signal component in the wobble signal is linked to a disturbance signal from a disturbance signal generator.

19 Claims, 3 Drawing Sheets

METHOD FOR REDUCING THE NOISE IN A WOBBLE SIGNAL

Figure 1:
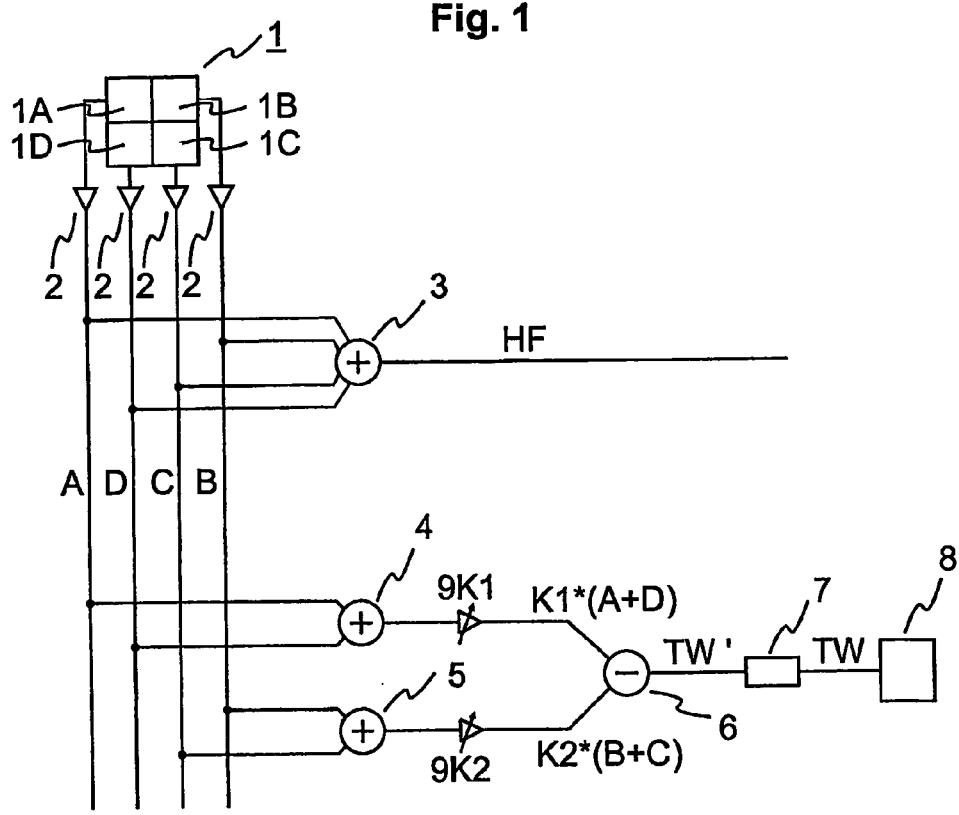

This application claims the benefit, under 35 U.S.C. § 365 of International Application PCT/EP02/08705 filed Aug. 5, 2002, which was published in accordance with PCT Article 21(2) on Feb. 27, 2003 in English and which claims the benefit of German patent application No. 10140326.7, filed Aug. 16, 2001.

The present invention relates to a method and a circuit for recovering the information contained in a wobbled track on an optical storage medium.

Methods such as these are used, for example, in appliances for reading from and/or writing to optical storage media with wobbled tracks, in order to obtain address information from the wobbled tracks and to use the wobble frequency to produce a write clock.

In general, in optical storage media which are in the form of discs and are suitable for reading and/or writing embossed tracks are formed such that they represent an interleaved spiral or concentric circles. Especially in the case of optical storage media which are suitable for writing to, the embossed tracks additionally have a track wobble in a specific form, in order to find specific positions on the medium. This means that the track is not embossed in an approximately straight line, but in serpentine lines. In this case, by way of example, the shape of these serpentine lines contains address information which is used to identify a specific position on this optical storage medium. Various methods are used for coding, examples of which include frequency modulation or phase modulation. Furthermore, the wobble signal may also be used for rotation speed information or for presetting a write data rate.

Normally, the modulation shift of this track wobble is kept small, so that there is no noticeable effect on the track control and the read quality of the data signal. The modulation shift is thus kept in the order of magnitude of a few percent of the track separation. Furthermore, the modulation frequency is designed to be in a frequency band which is typically above the upper cut-off frequency of the tracking regulator, but is below the lowermost signal frequency of the data signal. However, the small modulation shift means that the signal-to-noise ratio of the wobble signal obtained from it is relatively low. Nevertheless, the coded information and the fundamental frequency should be capable of being coded and reconstructed reliably, in order to allow reliable reading and writing. Disturbance noise components must therefore be effectively suppressed.

U.S. Pat. No. 5,717,679 discloses a system which is able to correct the noise components in the wobble signal resulting from any eccentricity of the wobbled track. The circuit which is specified for this purpose uses variable-gain amplifiers in order to compensate for different illumination levels of two detector halves. The system is based on the CD-R technique, which uses a wobble frequency of 22.05 kHz. Since the lowest signal frequency of the data signal is 934 kHz, those data signal components which are likewise present in the wobble signal can easily be removed by means of a low-pass filter, as is also disclosed in U.S. Pat. No. 5,717,679. One disadvantage of this known system is that low-pass filtering is impossible when using wobble frequencies which are close to the lowest signal frequency, as is the case, for example, with DVD technology (wobble frequency 825 kHz). Disturbance data signal components therefore cannot be removed with the disclosed system at high wobble frequencies.

One aim of the invention is to describe a method within an appliance for reading from and/or writing to optical storage media, which can remove disturbance data signal components in the wobble signal even when the wobble frequency and the lowest signal frequency are close to one another.

According to the invention, this object is achieved in that the signals from two detector halves of a photodetector from which a wobble signal is obtained and which is used for reading the data contained in a track on an optical storage medium are provided with weighting factors which are adjusted dynamically during operation of the appliance. In order to adjust the weighting factors, the data signal component in the wobble signal is linked to a disturbance signal from a disturbance signal generator. Dynamic adjustment of the weighting factors has the advantage that the data signal components in the wobble signal are always suppressed optimally, even if any changes occur in the illumination level of the photodetector during operation.

According to the invention, the signals from the two detector areas of the photodetector are provided with mutually reciprocal weighting factors. This has the advantage that the amplitude of the wobble signal obtained from the difference between the signals from the two detector surfaces is not influenced by the weighting factors.

According to the invention, the disturbance signal is digitised before being linked to the data signal component of the wobble signal, so that the linking process is carried out as a synchronous demodulation process. The advantage of using a digitised disturbance signal is that the synchronous demodulation represents multiplication by ±1, and, technically, this can be carried out easily.

The wobble signal is advantageously normalized before determining the data signal component. This may be done, for example, by means of an averaged sum signal or the signal from one detector half. In consequence, the amplitude of the wobble signal is less dependent on the light power of a light source in the optical scanner, or reflection on the optical storage medium. The reaction time of the control loop to dynamic adjustment of the weighting factors is then likewise less dependent on these variables. One advantage of using an averaged sum signal is that such an averaged sum signal is generally already available in appliances for reading from and/or writing to optical storage media.

In a further method according to the invention, the amplitude of the wobble signal is kept constant, by the signals from the two detector halves being normalized separately by means of their respective averaged sum signal.

According to the invention, disturbance data signal components in the wobble signal are removed by means of a circuit which uses one of the methods mentioned above.

A method according to the invention or a circuit according to the invention is advantageously used for recovering the information contained in a wobbled track on an optical storage medium in an appliance for reading from and/or writing to optical storage media.

Figure 2:
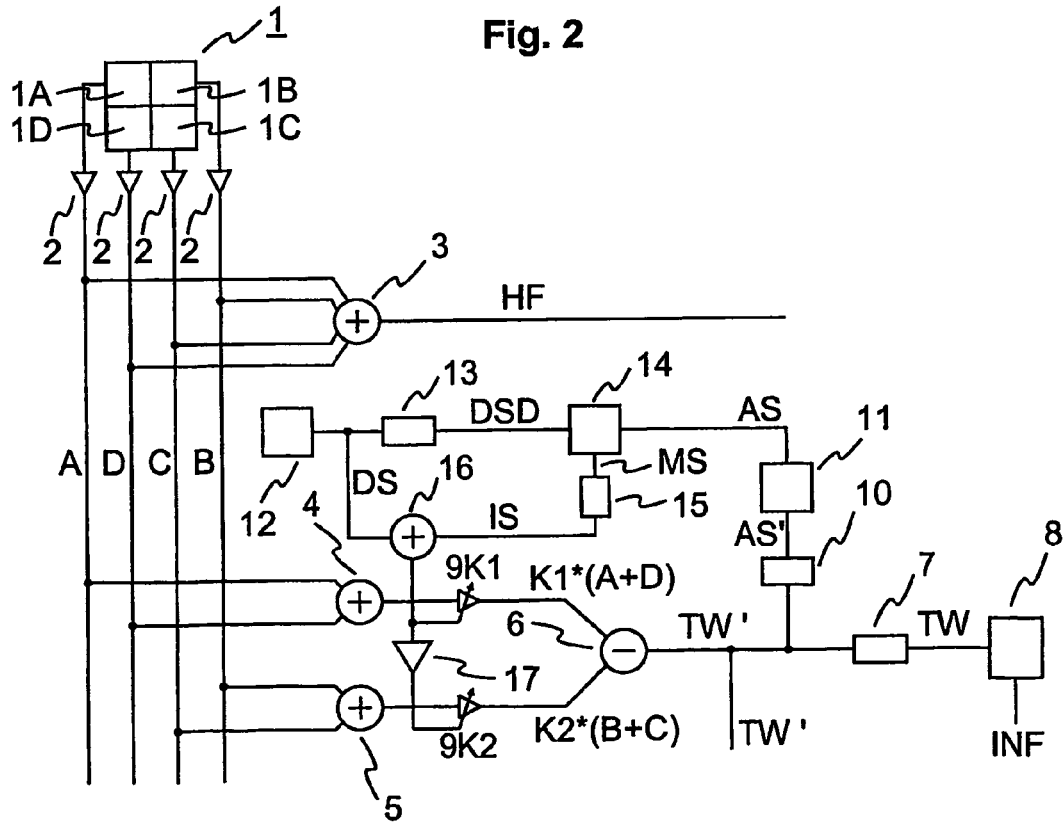
Figure 3:
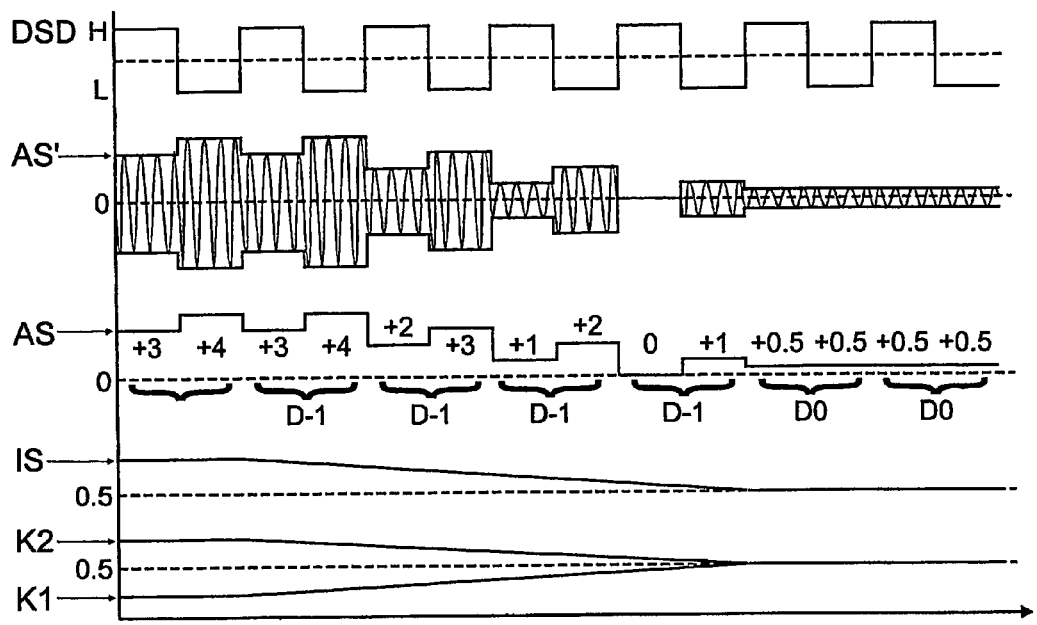
Figure 4:
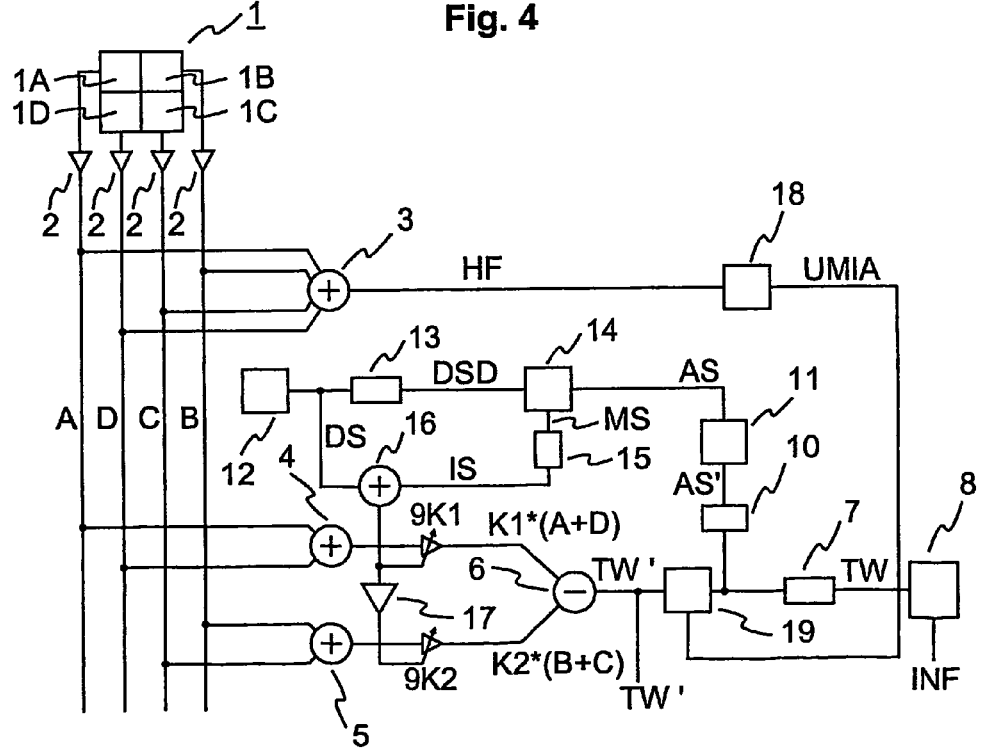
Figure 5:
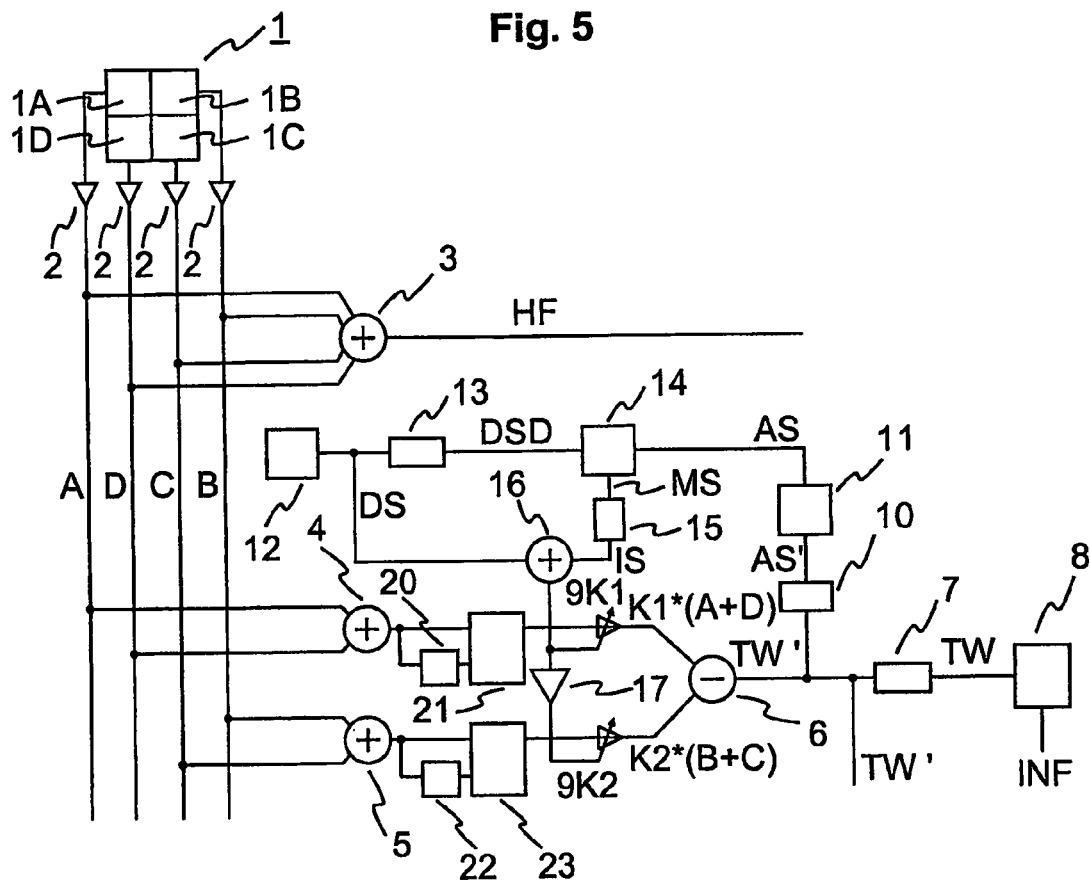
Figure 6:
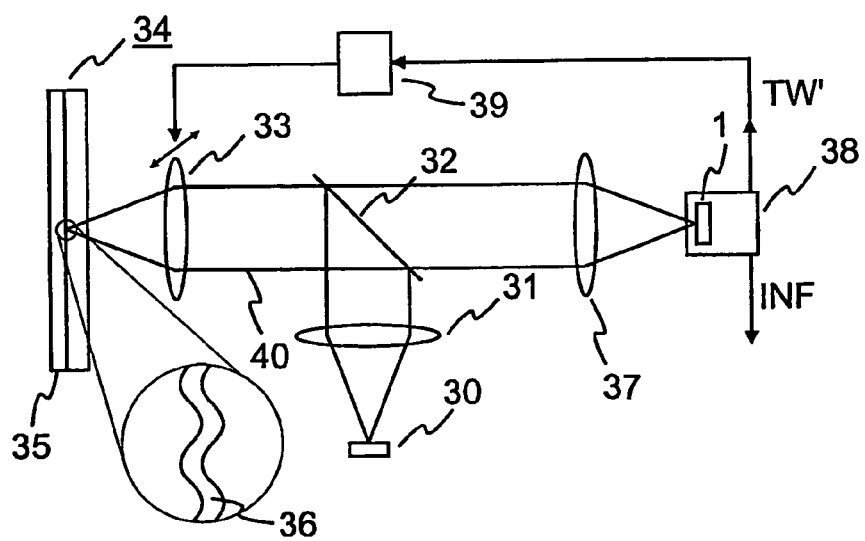

The invention will be explained in the following text with reference to advantageous exemplary embodiments and using FIGS. 1 to 6. Combinations of advantageous features are likewise within the applicability area of the invention. In the figures, identical reference symbols denote the same components and signals. In the figures:

FIG. 1: shows an arrangement for obtaining a wobble signal according to the prior art;

FIG. 2: shows an arrangement according to the invention for automatic adjustment of the weighting factors;

FIG. 3: shows a signal diagram to explain the method of operation of an arrangement according to the invention;

FIG. 4: shows an arrangement corresponding to FIG. 2, with the wobble signal being normalized;

FIG. 5: shows an arrangement corresponding to FIG. 2, with the signals of the two detector halves being normalized; and FIG. 6: shows an appliance for reading from and/or writing to optical storage media, which has an arrangement according to the invention for automatic adjustment of the weighting factors.

FIG. 6 shows an appliance for reading from and/or writing to optical storage media 34, which has an arrangement 38 according to the invention for obtaining information INF contained in a wobbled track 36 on the optical storage medium. The scanning beam 40 which is emitted from a light source 30 is collimated by a collimator 31, and is diverted by means of a beam splitter 32. An objective lens 33 focuses the scanning beam 40 onto the wobbled track 36 of a layer 35 of an optical storage medium 34 which carries information. The scanning beam 40 reflected from the layer which carries the information is collimated by the objective lens 33 and is imaged on the photodetector 1 by means of an imaging unit 37. A tracking error signal TW' and the information INF are obtained from the signals A, B, C, D from the photodetector 1 by means of an arrangement 38 according to the invention for recovering the information INF contained in the wobbled track 36 on the optical storage medium 34. The tracking error signal TW' is supplied to a tracking regulator 39, which itself ensures that the scanning beam 40 moves as close as possible to the track centre of the wobbled track 36.

FIG. 1 shows an arrangement for obtaining a wobble signal TW, which is used by a decoding unit 8 to decode the information INF contained in the wobbled track 36 on an optical storage medium 34, according to the prior art. The basis for obtaining the signal is the linking of the signals A, B, C, D from a photodetector 1. This makes use of the characteristic that the scanning beam 40 which strikes the optical storage medium 34 as shown in FIG. 9 causes an effect which makes it possible to use the push-pull tracking control method. This effect is based on the principle that a diffraction effect occurs at the edges of the tracks 36, so that not only is a vertical beam (zeroth order) reflected in the direction of the photodetector 1 from the memory layer 35 which carries the information, but also higher-order beams, which are not reflected precisely at right angles to the surface of the memory layer 35. In this case, an objective lens 33 is generally used to collect the reflected zeroth order and $\pm 1^{st}$ order beams and to image them on a photodetector 1, which is subdivided into at least two areas 1A+1D, 1B+1C. In the process, destructive interference of different intensity is formed in the overlapping area between the zeroth order and $\pm 1^{st}$ order as a function of the tracking position, and this is evaluated in the form of a tracking error signal TW'. The resultant tracking error signal TW' is thus referred to as the push-pull tracking error signal.

In order to obtain this tracking error signal TW', the output signals A, B, C, D from the photodetector 1 are first of all amplified by means of an amplifier or amplifiers 2, and are then linked, for example as shown in FIG. 1. The photodetector 1 is typically subdivided into four areas 1A, 1B, 1C, 1D, in order to obtain a focusing error signal (not shown) at the same time, in addition to the tracking error signal TW'. However, in order to obtain the tracking error signal TW' using the push-pull effect, it is sufficient to subdivide the photodetector 1 into a right-hand half 1B+1C and a left-hand half 1A+1D, and to subtract the output signals from these two detector halves from one another. In the case of a four-quadrant detector, this is done by first of all carrying out the logic operations A+D and B+C using two adders 4, 5. The difference signal (A+D)–(B+C) is then formed by means of a differential amplifier 6. The difference signal (A+D)–(B+C) obtained in this way is then supplied to a tracking regulator 39, as the tracking error signal TW'. The tracking regulator 39 for its part ensures that the scanning beam 40 is moved as close as possible to the track centre of a predetermined track 36.

In order to decode the Information INF contained in the wobbled tracks 36 on an optical storage medium 34, or in order to form a write clock, a wobble signal TW is supplied to a decoding unit 8 which, by way of example, emits address information and/or a write clock. The wobble signal TW is itself formed by filtering from the push-pull tracking error signal TW', by means of a filter 7.

On the other hand, the data signal HF which represents the information content of the optical storage medium 34 is formed from the output signals A, B, C, D from the photodetector 1 by addition in an adder 3. In order to allow detection by addition of the photodetector signals A, B, C, D, the information is stored by writing light/dark contrasts or by embossing so-called pits on the optical storage medium 34.

If the scanning beam 40 is following the centre of an embossed track 36, the scanning beam 40 is reflected on the layer 35 of the optical storage medium 34 which carries the information, such that, ideally, a round light spot is imaged on the photodetector 1, at whose sides the already mentioned interference resulting from the push-pull effect is observed. The total intensity of this light spot is modulated by the brightness contrast of the area illuminated by the scanning beam 40.

Since the data is stored by means of structures which cause brightness differences, the intensity of the light spot is thus modulated such that it corresponds to the data on the memory layer 35. Ideally, this is carried out in a synchronized manner on the two detector halves 1A+1D, 1B+1C. Since the tracking error signal TW' and the wobble signal TW derived from it are derived from the difference (A+D)–(B+C) between the signals from the detector halves 1A+1D, 1B+1C the data signal component caused by the brightness contrast is cancelled out during the subtraction process by the differential amplifier 6. However, if the imaging of the scanning beam 40 on the photodetector 1 is not ideally axially symmetrical, then a data signal component AS' is superimposed on the desired signal component which represents the wobbled track 36. This results in it not being possible to evaluate those signal components which are caused by the wobbled track 36 as well as before, so that errors occur in the address evaluation.

An improvement is achieved if the weighting between the output signals A+D, B+C from the two halves 1A+1D,1B+1C of the photodetector 1 is changed before the subtraction process by the differential amplifier 6, so that the contrast-dependent components of the alternating light amplitudes are cancelled out on the two halves 1A+1D, 1B+1C of the photodetector 1.

To this end, the four photodetector signals A, B, C, D are first of all amplified by means of amplifiers 2. Two signal elements A+D, B+C are then produced by summation in the adders 4, 5 and these reproduce the modulation on the respective halves 1A+1D, 1B+1C of the photodetector 1. Before the subsequent subtraction process, the signal A+D is passed through an amplifier 9K1 with a variably adjustable gain K1, so that the difference signal TW' is formed in accordance with the following relationship:

$$TW'=K1\times(A+D)-(B+C)$$

The weighting process results in the data signal components which are imaged onto the detector halves 1A+1D, 1B+1C as a result of the different modulation being set to the same magnitude before the subtraction process, so that they cancel one another out. This can also be achieved in an equivalent manner by passing the signal B+C through an amplifier 9K2 with a variably adjustable gain K2, corresponding to the following signal calculation:

$$TW'=(A+D)-K2\times(B+C)$$

The two solutions have the common feature that the resultant amplitude of the difference signal TW' changes as a function of the weighting factor K1, K2 setting. This can be avoided by the two signals A+D, B+C being weighted, and by the weighting factors K1, K2 being matched to one another such that K2=1−K1. The following signal calculation is thus used:

$$TW'=K1\times(A+D)-(1-K1)\times(B+C)$$

The tracking error signal TW' normally has any further undesirable signal components, such as low-frequency disturbances caused by residual tracking errors and so on, removed from it by means of a filter 7, in order to obtain the wobble signal TW which is supplied to the decoding unit 8.

During operation of the appliance for reading from and/or writing to optical storage media 34, it is possible, however, for a situation to occur caused by heating, ageing or other disturbance variables in which the intensity distribution or position of the image on the photodetector 1 changes. A situation such as this can occur in particular as a result of residual errors in focus control or in tracking control 39. If the weighting factors K1, K2 are set only once during production of the appliance, it is impossible to compensate for such variables, which vary dynamically.

In order to overcome this disadvantage, it is advantageous to adjust the weighting factors K1, K2 automatically during operation such that the disturbance data signal components cancel one another out as well as possible in the subtraction process 6.

An arrangement according to the invention for automatic adjustment of the weighting factors K1, K2, in which the peak value signal AS of the data signal component AS' in the difference signal TW' or in the wobble signal TW is determined by means of a peak value detector 11 and is demodulated in synchronism with the digitised disturbance signal DSD from a disturbance signal generator 12, the result of the synchronous demodulation is integrated and is added to the disturbance signal DS and the result of the addition is used to adjust the weighting factors K1, K2, is shown in FIG. 2.

The difference signal TW' obtained in the manner described in FIG. 1 has low-frequency disturbances removed from it by means of a filter 10 which passes only the data signal frequency band, and is supplied to the input of a peak value detector 11. The wobble signal TW can also be used instead of the difference signal TW'. The peak value signal AS from the peak value detector 11 is supplied to the first input of a synchronous demodulator 14. The second input of the synchronous demodulator 14 is supplied with the disturbance signal DSD, digitised by a comparator 13, from a disturbance signal generator 12. The output signal from the synchronous demodulator 14 is integrated by an integrator 15, and is added by means of an adder 16 to the disturbance signal DS. The output signal from the adder 16 controls the first weighting factor K1, while the output signal converted by a converter 17 controls the second weighting factor K2. The converter may be, for example, a divider, an inverter, or a functional block, which for a value x calculates the value 1−x. Of course, other types of converters can also be used.

The invention is based on the alternating light modulations on the two detector halves 1A+1D, 1B+1C being in phase with one another. For this reason, the sum of the output signals A, B, C, D from the photodetector areas 1A, 1B, 1C, 1D is used to obtain the data signal. The voltage produced in the photodetector 1 is in this case proportional to the intensity reflected from the optical storage medium 34.

A corresponding situation applies to the two detector halves 1A+1D, 1B+1C, so that if the weighting K1, K2 is set to be the same in the two branches during the subtraction process by means of the differential amplifier 6, the data signal components cancel one another out, provided the amplitudes are equal. However, if there is an amplitude difference, then an undesirable data signal component AS' remains in the difference signal TW' after the subtraction process, and this is also present in the wobble signal TW after filtering by the filter 7. The amplitude of this undesirable signal component increases as the asymmetry of the imaging process on the photodetector 1 increases. The minimum amplitude of the data signal component AS' can be reached by matching the weighting factors K1, K2 correctly.

The amplitude of the data signal component AS' is measured for this purpose. In order to separate the data signal component AS' from the desired wobble signal, a filter 10 which passes only the data signal frequency band is advantageously inserted between the output of the differential amplifier 6 and the peak value detector 11. The peak value detector 11 thus measures only the peak value signal AS of the undesirable data signal element AS' of the difference signal TW', which is intended to be minimized by correct adjustment of the weighting factors K1, K2. This measured amplitude value AS is supplied to the first input of a synchronous demodulator 14. The second input of the synchronous demodulator 14 is fed with a binary signal DSD which is once again derived from a disturbance signal DS. This disturbance signal DS is produced in a disturbance signal generator 12, and is at the same time connected to a first summation point of an adder 16. The output of the synchronous demodulator 14 is connected via an integrator 15 to the other summation point of the adder 16, whose sum output itself adjusts the weighting factors K1, K2. The method of operation of this arrangement will be explained in the following text with reference to the signal diagram in FIG. 3, which shows some of the signals under the assumption of a symmetrical illumination of the photodetector 1. It is further assumed that the weighting factors of both branches A+D, B+C shall be K1=K2=0.5.

First of all, let us assume that the output voltage from the integrator 15 shall be a positive value relatively far away from the optimum value 0.5. The disturbance signal generator 12 produces a sinusoidal or square-wave signal, which oscillates symmetrically about zero and modulates the weighting K1, K2 between the two signal branches A+D, B+C which are supplied from the photodetector 1 about a predetermined operating point or a mean weighting. In this context, the term operating point means that both branches have a gain of 0.5 without modulation. When the disturbance signal DS is activated, this results, for example, in the gain of the first branch A+D being reduced by 0.1, starting from a gain of 0.5, while the other branch B+C has a gain of 0.5+0.1 when the disturbance signal DS actually reaches its positive maximum value. The first branch A+B then has a gain of 0.6, and the other branch B+C a gain of 0.4 at the negative maximum value.

If the photodetector 1 is illuminated axially symmetrically, the data signal component AS' in the difference signal TW' is a minimum when the gain is 0.5 in both branches A+D, B+C. In consequence, the data signal component AS' in the difference signal TW' increases somewhat if the weighting factors K1, K2 are mistuned symmetrically. This increase in the data signal component AS' is, however, the same for both maximum values of the disturbance signal DS. The peak value signal AS from the peak value detector 11 thus produces equal values in this case.

If the data signal components AS' in the difference signal TW', and therefore the corresponding values of the peak value signal AS, differ in terms of the positive and negative disturbance amplitude, as depicted in FIG. 3, it can be deduced from this that the operating point, that is to say the weighting K1, K2 set at that time, is not optimum.

The analogue disturbance signal mentioned above has a relatively small amplitude in order to keep small the increase in the data signal component AS' in the difference signal TW' resulting from the modulation of the weighting factors K1, K2. A synchronous demodulator 14 is used in order nevertheless to determine the correct operating point or the optimum mean weighting K1, K2. For this purpose, the disturbance signal DS is digitised by means of a comparator 13, and is connected to the digital input of the synchronous demodulator 14. The digitised disturbance signal DSD from the comparator 13 is, for example, at logic "L" when the disturbance signal DS is less than zero, and is at logic "H" when the disturbance signal DS is greater than zero. The synchronous demodulator 14, which is controlled by this signal DSD, multiplies the peak value signal AS, which is measured by the peak value detector 11, by +1 or −1 corresponding to the value of the digitised disturbance signal DSD. The output of the synchronous demodulator 14 controls an integrator 15, which itself controls the first weighting factor K1 via the first summation point of an adder 16, and controls the second weighting factor K2 via an additional converter 17.

If the data signal components AS' of the difference signal TW' are not the same for the two maximum values of the disturbance signal DS, the peak value signal AS from the peak value detector 11 in consequence supplies different values with a difference D. These amplitude values are multiplied by +1 or −1 by the synchronous demodulator 14, whose output then supplies a signal MS which is alternatively positive or negative and whose magnitude corresponds to that of the measured amplitude value of the data signal component AS'. The integrator 15 determines the area integral IS of the synchronous demodulator output signal MS and readjusts the weighting factors K1, K2 until the measured data signal components AS' are of equal magnitude. The arrangement thus corresponds to a control loop with an integrating response, which varies the weighting factors K1, K2 until the data signal components AS' are the same for positive and negative disturbance amplitudes.

The advantage of the control loop having an integrating response is that, after a time which is dependent on the integration time constant, the weighting K1, K2 is always set such that the data signal component AS' in the wobble signal TW becomes zero. The remaining residual error, that is to say in this case the data signal component AS' in the wobble signal TW, always becomes zero when using a control loop with an integrating response. The integration time is, however, dependent on the magnitude of the signal at the input of the integrator 15, that is to say in the case of the weighting factor control loop, it is dependent on the amplitude of the output of the synchronous demodulator 14. This amplitude itself depends on the amplitude of the input signal to the synchronous demodulator 14, that is to say on the peak value signal AS from the peak value detector, and hence on a difference signal TW'. If, for example, the light power from the light source in the optical scanner or the reflection from the optical storage medium is halved, then the sensitivity of the difference signal TW' and hence the output amplitude from the synchronous demodulator 14 are halved, so that the integration time is doubled.

The sensitivity of the difference signal TW' is made independent of the light power or reflection by means of normalization. This is achieved, for example, by normalizing the signal TW' using an averaged sum signal, as is shown in FIG. 4. The averaged sum signal UIMA from the averager 18 is supplied to a normalizer 19, which uses the sum signal UIMA to normalize the difference signal TW'. In this case, the integration time is less dependent on the light power from the light source 30 in the optical scanner or the reflection from the optical storage medium 34. Furthermore, such an averaged sum signal UIMA is already present in appliances for reading from and/or writing to optical recording media.

It is likewise possible to normalize the signals A+D, B+C from the two detector halves 1A+1D, 1B+1C separately, by means of their respective averaged sum signal, before amplification by the variable amplifiers 9K1, 9K2 and before subtraction by the differential amplifier 6, as is illustrated in FIG. 5. The sum signal A+D from the first detector half 1A+1D is for this purpose supplied to the averager 20, whose output signal is supplied to the normalizer 21 and is used to normalize the sum signal A+D. In a corresponding way, the sum signal B+C from the second detector half 1B+1C is normalized by means of the averager 22 and the normalizer 23. The amplitudes of the signals from the two detector halves 1A+1D, 1B+1C are then completely independent of the reflection and of the light power.

The invention claimed is:

1. Method for obtaining information from a wobbled track on an optical storage medium by producing a wobble signal from the difference between the signals from two photodetector areas of a photodetector, with the signal from one detector area being provided with a weighting factor, wherein a disturbance signal, which is produced by a disturbance signal generator, is linked to a data signal component which is contained in the wobble signal and is used for automatic adjustment of the weighting factor.

2. Method according to claim 1, wherein the signal from the other detector area is provided with a weighting factor.

3. Method according to claim 2, wherein the weighting factors are contrariwise.

4. Method according to claim 3, wherein the weighting factors depend from one another according to K2=1−K1.

5. Method according to claim 1, wherein the disturbance signal is digitised, the digitised disturbance signal and the data signal component of the wobble signal are demodulated in synchronism with one another, and the resultant signal is integrated and is added to the disturbance signal.

6. Method according to claim 5, wherein the wobble signal is normalized.

7. Method according to claim 5, wherein the signals from the two detector halves are normalized.

8. Method according to claim 1, wherein the data signal component of the wobble signal is obtained by filtering from the wobble signal.

9. Method according to claim 1, wherein the peak value signal of the data signal component of the wobble signal is used for the linking process.

10. Circuit for obtaining information from a wobbled track on an optical storage medium by producing a wobble signal from the difference between the signals from two photodetector areas of a photodetector, with the signal from one detector area being provided with a weighting factor, wherein said circuit has a disturbance signal generator for obtaining a disturbance signal, and a logic unit for linking the disturbance signal and a data signal component which is contained in the wobble signal, the output signal from which logic unit is supplied to a unit for determining a weighting signal, which is added by an addition unit to the disturbance signal and adjusts the weighting factor.

11. Circuit according to claim 10, wherein the signal from the second detector area is provided with a weighting factor, which is set by a weighting signal generated by a converter.

12. Circuit according to claim 11, wherein the weighting factors are contrariwise.

13. Circuit according to claim 12, wherein the weighting factors depend from one another according to $K2=1-K1$.

14. Circuit according to claim 10, wherein said circuit has a comparator for digitising the disturbance signal, a synchronous demodulator for multiplication of the digitised disturbance signal and the data signal component of the wobble signal, an integrator for integration of the output signal from the synchronous demodulator, and an addition amplifier for addition of the disturbance signal and of the output signal from the integrator.

15. Circuit according to claim 14, wherein said circuit has an averager and a normalizer, in order to normalize the wobble signal.

16. Circuit according to claim 14, wherein said circuit has an averager and a normalizer in order to normalize the signals from the two detector halves.

17. Circuit according to claim 10, wherein said circuit has a filter in order to obtain the data signal component from the wobble signal by filtering.

18. Circuit according to claim 10, wherein said circuit has a peak value detector in order to obtain the peak value signal from the data signal component in the wobble signal.

19. Appliance for reading from and/or writing to optical storage media, wherein said appliance has a circuit according to claim 10.

* * * * *